United States Patent
Iwamura

(10) Patent No.: US 7,990,478 B2
(45) Date of Patent: Aug. 2, 2011

(54) INFORMATION PRESENTATION APPARATUS AND INFORMATION PRESENTATION METHOD

(75) Inventor: Kazuaki Iwamura, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 12/703,029

(22) Filed: Feb. 9, 2010

(65) Prior Publication Data

US 2010/0302442 A1    Dec. 2, 2010

(30) Foreign Application Priority Data

May 29, 2009  (JP) ................ 2009-131563

(51) Int. Cl.
    H04N 5/268    (2006.01)
(52) U.S. Cl. ......... 348/706; 348/569; 348/563; 348/734
(58) Field of Classification Search ............... 348/563, 348/569, 705, 706, 734, 725; 725/59, 38
    See application file for complete search history.

(56) References Cited

U.S. PATENT DOCUMENTS

| | | | |
|---|---|---|---|
| 6,169,879 B1* | 1/2001 | Perlman | 725/119 |
| 7,178,157 B1* | 2/2007 | Kimura et al. | 725/38 |
| 7,420,621 B2* | 9/2008 | Tsukamoto et al. | 348/569 |
| 2004/0143847 A1 | 7/2004 | Suzuki | |
| 2007/0024462 A1 | 2/2007 | Kitaura | |
| 2007/0285568 A1* | 12/2007 | Kurose | 348/563 |
| 2008/0216130 A1 | 9/2008 | Katayama | |
| 2008/0320395 A1 | 12/2008 | Yuasa | |

FOREIGN PATENT DOCUMENTS

| | | |
|---|---|---|
| JP | 57-142688 | 9/1982 |
| JP | 05-075943 | 3/1993 |
| JP | 2004-208290 | 7/2004 |
| JP | 2007-134956 | 5/2007 |
| JP | 2007-036906 | 8/2007 |
| JP | 2008-066899 | 3/2008 |
| JP | 2008-154217 | 3/2008 |
| JP | 2008-147720 | 6/2008 |
| JP | 2009-027599 | 5/2009 |
| JP | 2009-055136 | 12/2009 |

OTHER PUBLICATIONS

Japanese Office Action dated May 11, 2010 for application No. 2009-131563 (U.S. Appl. No. 12/703,029) (English Translation).
Japanese Office Action dated Aug. 3, 2010 for application No. 2009-131563 (U.S. Appl. No. 12/703,029) (English Translation).

* cited by examiner

Primary Examiner — M. Lee
(74) Attorney, Agent, or Firm — Blakely, Sokoloff, Taylor & Zafman LLP

(57) ABSTRACT

According to an aspect of the present invention, there is provided an information presentation apparatus including: video/audio signal input terminals to be connected to video/audio signal output terminals of a signal output apparatus; a receiving section that receives an apparatus information transmitted from a remote controller, the apparatus information being related to the signal output apparatus; a determination section that determines a compatible terminal combination among combinations of all the input terminals and all the output terminals based on the received apparatus information; and a presentation section that presents the determined compatible terminal combination.

13 Claims, 5 Drawing Sheets

INFORMATION PRESENTATION APPARATUS AND INFORMATION PRESENTATION METHOD

CROSS-REFERENCE TO RELATED APPLICATIONS

This application is based upon and claims the benefit of priority from Japanese Patent Application No. 2009-131563, filed on May 29, 2009, the entire contents of which are incorporated herein by reference.

BACKGROUND

1. Field

An aspect of the present invention relates to an information presentation apparatus and an information presentation method for presenting information which relates to a connection to an external apparatus.

2. Description of the Related Art

In recent years, information presentation apparatus have spread widely which have plural signal input terminals for input of a video signal or an audio signal that is output from any of external apparatus such as a recording apparatus (e.g., HDD recorder) and a reproducing apparatus (e.g., optical disc player) and which output the input signal (information).

In recent years, since such information presentation apparatus have come to be able to display a high-resolution image (e.g., a Hi-Vision image of a ground-wave digital broadcast) of a video signal, they have come to be equipped with various forms of terminals such as an HDMI terminal and an IEEE 1394 terminal as signal input/output terminals in addition to a commonly used pin terminal for a composite signal so as to be able to receive and output component signals and a high-resolution signal.

In this situation, it is expected that a user is allowed to easily connect various forms of output terminals of external apparatus to various forms of input terminals of an information presentation apparatus.

For example, JP-2008-147720-A discloses a method for allowing a user to easily connect apparatus to each other by presenting forms of terminals to be used for connection of the apparatus, details of a setting for signal output, and other information (refer to FIG. 5, paragraph [0089]).

However, the method of JP-2008-147720-A is such that first a user himself or herself selects a type of an electronic apparatus to be connected externally and then selects an optimum form of a terminal to be connected. Therefore, a proper terminal cannot be selected unless the user is aware of forms of terminals of an electronic apparatus to be connected externally, specifications of various terminals that are presented in a selectable manner, and other information. As a result, it is difficult for the user to easily connect an electronic apparatus having output terminals and an electronic apparatus having input terminals.

BRIEF DESCRIPTION OF THE DRAWINGS

A general architecture that implements the various feature of the present invention will now be described with reference to the drawings. The drawings and the associated descriptions are provided to illustrate embodiments of the present invention and not to limit the scope of the present invention.

DETAILED DESCRIPTION

Various embodiments according to the present invention will be described hereinafter with reference to the accompanying drawings. In general, according to one embodiment of the present invention, there is provided an information presentation apparatus including: video/audio signal input terminals to be connected to video/audio signal output terminals of a signal output apparatus; a receiving section that receives an apparatus information transmitted from a remote controller, the apparatus information being related to the signal output apparatus; a determination section that determines a compatible terminal combination among combinations of all the input terminals and all the output terminals based on the received apparatus information; and a presentation section that presents the determined compatible terminal combination.

First Embodiment

A first embodiment will be hereinafter described with reference to the drawings.

Figure 1:
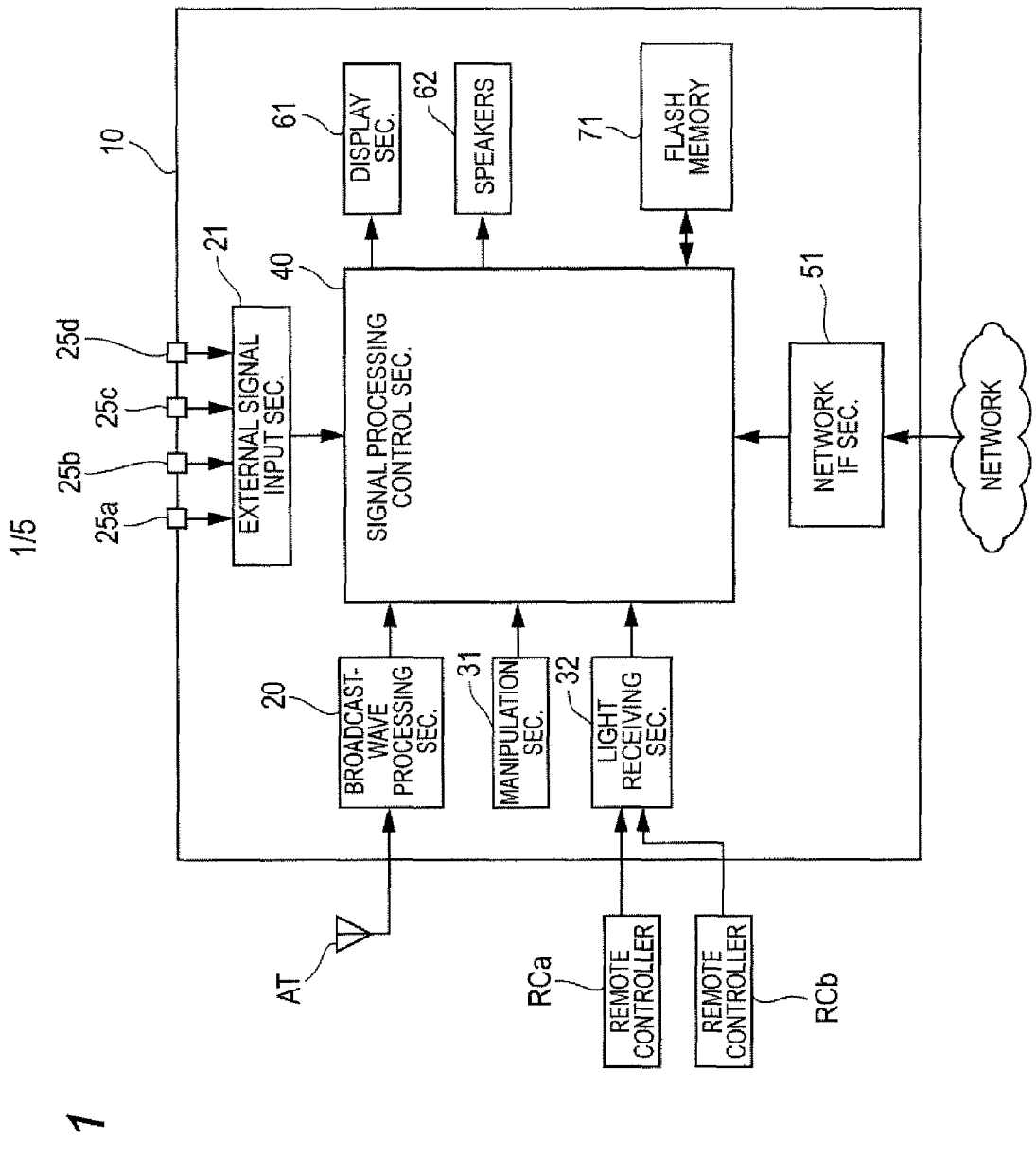
FIG. 1 illustrates a block diagram of a TV receiver according to a first embodiment.

FIG. 1 illustrates a TV receiver as an information presentation apparatus according to the first embodiment. Although the first embodiment is directed to a TV receiver, the embodiment can also be applied to an HDD recorder, a DVD recorder, an information processing terminal, a portable mobile terminal, or the like having the same configuration as in the first embodiment as well as a broadcast receiving apparatus (e.g., set-top box) which receives a radio broadcast or a cable broadcast using the Internet or the like.

The TV receiver 10 includes a broadcast-wave processing section 20, an external signal input section 21, signal input terminals 25a-25d, a manipulation section 31, a light receiving section 32, a signal processing control section 40, a network interface (IF) section 51, a display section 61, speakers 62, a flash memory 71, etc.

The broadcast-wave processing section 20 acquires signals of digital broadcast waves or analog broadcast waves received by an antenna AT, tunes into a particular channel of the acquired signals and performs demodulation/decoding on a selected signal, and outputs video/audio data, data for generation of an EPG, data for a data broadcast, and other data to the signal processing control section 40. In the first embodiment, the broadcast-wave processing section 20 acquires data that correlates apparatus information indicating a type number etc. of a signal output apparatus with output terminal information indicating types etc. of all signal output terminals of the signal output apparatus, and outputs the acquired data to the signal processing control section 40.

The external signal input section 21 performs given processing on video/audio data (signal) that is output from a signal output apparatus connected externally and input via a particular one of the signal input terminals 25a-25d, and outputs a resulting signal to the signal processing control section 40. Furthermore, the external signal input section 21 selects a signal input terminal that is judged suitable for connection to a signal output apparatus connected externally, and outputs, to the signal processing control section 40, video/audio data (signal) that is input via the selected terminal.

The signal input terminals 25a-25d are input terminals each of which is to be connected, via a connection cable, to an output terminal of a signal output apparatus such as an HDD recorder which outputs video/audio data (signal) and to receive a signal from the output terminal. Plural (in the first embodiment, four) terminals of the same kind or different kinds such as a pin terminal for a Y/C-mixed composite signal, an S terminal for a Y/C-separated composite signal, a D terminal for component signals, and an HDMI terminal which complies with the HDMI standard are provided as video signal input terminals of the signal input terminals 25a-25d.

When connected to a network such as the Internet, a LAN, or a WAN, the network IF section 51 acquires video/audio data such as a program, data for generation of an EPG, data of a data broadcast, and other data which are provided over the connected network and outputs the acquired data to the signal processing control section 40. When connected to a recording medium such as an external HDD or a memory card via a LAN or the like, the network IF section 51 exchanges video/audio data such as a program with the recording medium. The network IF section 51 acquires data that is provided via the connected network and correlates apparatus information and output terminals information, and outputs the acquired data to the signal processing control section 40.

The manipulation section 31 is equipped with manipulation buttons, and when a manipulation button is pressed, a manipulation information corresponding to the pressed button is output to the signal processing control section 40. The light receiving section 32 receives a signal from a remote controller RCa or a signal from a remote controller RCb, performs given processing on the received signal, and outputs a resulting signal to the signal processing control section 40. The signal from the remote controller RCa contains a manipulation information for the apparatus 10, and the signal from a remote controller RCb contains a manipulation information for an external apparatus and apparatus information. That is, a signal transmitted from the remote controller RCb contains not only a manipulation information but also apparatus information of the external apparatus that is to be manipulated by the remote controller Rob.

The signal processing control section 40 performs MPEG coding/decoding computation, separation of a video signal and an audio signal, data extraction from an input signal, decompression of a compressed signal, and other processing on a signal that is input from the broadcast-wave processing section 20, the external signal input section 21, the network IF section 51, or the like, and outputs resulting video signal and audio signal to the display section 61 and the speakers 62, respectively.

In the first embodiment, the signal processing control section 40 extracts apparatus information from a signal that is input from the light receiving section 32 and determines, based on the extracted apparatus information, signal input terminals that are compatible with signal output terminals that are correlated with the extracted apparatus information. Based on the determination result, the signal processing control section 40 performs processing of generating an OSD (on-screen display) image for presentation of information relating to a compatible terminal combination and other processing.

Equipped with a CPU (not shown), the signal processing control section 40 controls plural kinds of processing using modules provided in itself such as a work memory for software computation and modules connected to it such as the flash memory 71.

The display section 61 is a display module for displaying a moving image or an OSD image based on a video signal that is input from the signal processing control section 40 and, specifically, is a flat display such as an LCD (liquid crystal display). The display section 61 displays an OSD image that is generated by the signal processing control section 40 and serves for presentation of information relating to a compatible terminal combination.

The speakers 62 output a sound based on an audio signal input from the signal processing control section 40.

In this embodiment, the flash memory 71 is a nonvolatile memory that stores input terminal information and output terminal information. For example, the input terminal information includes types of all signal input terminals provided in the TV receiver 10, and output terminal information includes types of all signal output terminals provided in plural signal output apparatus. The flash memory 71 also stores programs to be run by the CPU (not shown) of the signal processing control section 40. In the first embodiment, the flash memory 71 stores not only input terminal information relating to the signal input terminals 25a-25d but also output terminal information that is acquired from the broadcast-wave processing section 20 and the network IF section 51 and that is correlated with apparatus information. For example, the flash memory 71 may be provided inside the signal processing control section 40.

Having the above configuration, the TV receiver 10 acquires the output terminal information correlated with the apparatus information transmitted from the remote controller Rob, determines compatible terminal combinations by comparing the acquired output terminal information with the input terminal information relating to the signal input terminals 25a-25d of the TV receiver 10, and displays them on the display section 61. The processing is mainly performed by the signal processing control section 40.

Next, a process for judging terminal compatibility between the TV receiver 10 and an HDD recorder 200 (signal output apparatus) will be described below with reference to FIG. 2.

Figure 2:
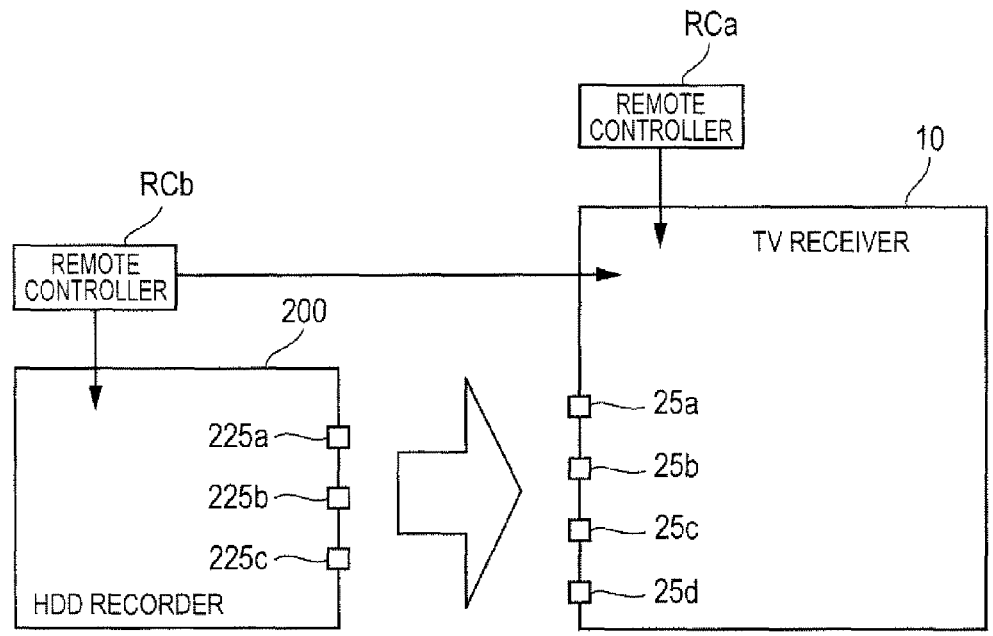
FIG. 2 is a view for explaining a process for judging terminal compatibility between the TV receiver and an HDD recorder.

FIG. 2 is a view for explaining the process for judging terminal compatibility between the TV receiver 10 and an HDD recorder 200.

The TV receiver 10 having the signal input terminals 25a-25d receives a manipulation information transmitted from the remote controller RCa and operates according to the received information.

The HDD recorder 200 having the signal output terminals 225a-225c receives a manipulation information transmitted from the remote controller RCb and operates according to the received information.

Further, the TV receiver 10 receives a signal transmitted from the remote controller RCb. The signal from the remote controller RCb contains apparatus information indicating a type number etc. of the HDD recorder 200. Upon receiving of the signal, the TV receiver 10 refers to the output terminal information stored in the flash memory 71 based on the apparatus information contained in the received signal, and determines output terminal information of the signal output terminals 225a-225c of the HDD recorder 200. Furthermore, the TV receiver 10 determines compatible terminal combinations for connection between the signal output terminals and the signal input terminals, based on the determined output terminal information of the signal output terminals 225a-225c and the stored input terminal information of the signal input terminals 25a-25d thereof.

That is, the TV receiver 10 can judge compatibility between the signal output terminals 225a-225c and the signal input terminals 25a-25d based on apparatus information contained in a signal transmitted from the remote controller RCb in a state that the HDD recorder 200 is not connected to any of the signal input terminals 25a-25d of the TV receiver 10.

Figure 3:
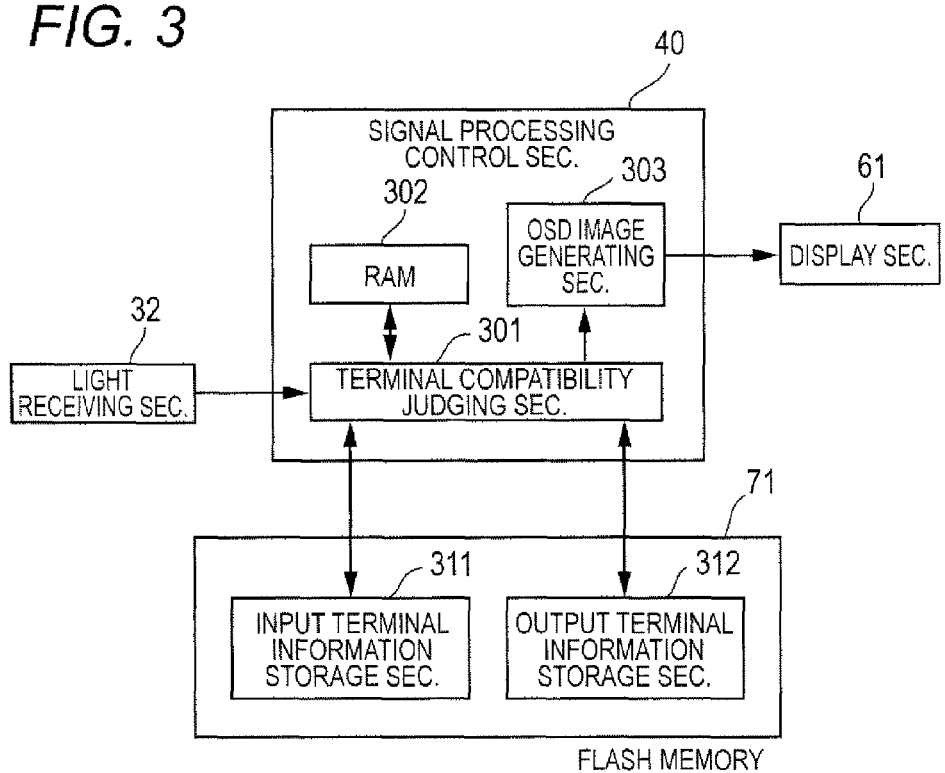
FIG. 3 is a view for explaining the terminal compatibility judging process according to the first embodiment for determining compatible terminal combinations based on information received from a remote controller and presenting them.

Next, the configuration for the terminal compatibility judging process will be described with reference to FIG. 3. FIG. 3 is a view for explaining plural modules that are provided in the signal processing control section 40 and the flash memory 71 (see FIG. 1) and serves to execute the terminal compatibility judging process.

The signal processing control section 40 includes a terminal compatibility judging section 301, a RAM 302, an OSD image generating section 303, etc. The flash memory 71 includes an input terminal information storage section 311, an output terminal information storage section 312, etc.

That is, in the terminal compatibility judging process, the terminal compatibility judging section 301 determines terminal combinations suitable for a connection to an external apparatus based on information that is input from the light receiving section 32 while exchanging information with the RAM 302, the input terminal information storage section 311 and the output terminal information storage section 312, and the OSD image generating section 303 and the display section 61 present information relating to the determined terminal combinations.

The input terminal information storage section 311 is stored with input terminal information relating to all the signal input terminals 25a-25d of the TV receiver 10. Input terminal information includes shape information such as a terminal shape and a shape of a connection cable to which the terminal is connected. When hardware of the TV receiver 10 is not to be changed, the input terminal information is stored at the time of manufacture of the TV receiver 10 and is not updated thereafter. The input terminal information may be updated if the hardware of the TV receiver 10 is updated.

The output terminal information storage section 312 is stored with output terminal information indicating types etc. of all signal output terminals of each of plural signal output apparatus. Each piece of output terminal information is stored so as to be correlated with apparatus information. That is, the output terminal information storage section 312 is an output terminal information database in which pieces of output terminal information are correlated with respective pieces of apparatus information, that is, plural respective apparatus information. The output terminal information can be updated. The user may be allowed to edit the output terminal information (e.g., add or delete a piece of output terminal information) on an apparatus-information basis.

The RAM 302 is a work memory that is used for temporary storage while the terminal compatibility judging process is executed by the terminal compatibility judging section 301. In the first embodiment, output terminal information is temporarily stored in the RAM 302. The RAM 302 may be provided outside the signal processing control section 40 rather than inside it.

The terminal compatibility judging section 301 extracts apparatus information indicating the type number etc. of the HDD recorder 200 from a signal that is input from the light receiving section 32, and determines terminals that are suitable for a connection to the HDD recorder 200 by referring to the input terminal information stored in the input terminal information storage section 311, the output terminal information stored in the output terminal information storage section 312, and other information while using the RAM 302 as a work memory. The terminal compatibility judging section 301 outputs the thus-determined information relating to the compatible terminal combinations to the OSD signal generating section 303 and requests the OSD signal generating section 303 to generate an image based on the information thus output.

To update the output terminal information stored in the output terminal information storage section 312, the terminal compatibility judging section 301 stores, in the output terminal information storage section 312, new output terminal information that has been acquired via the broadcast-wave processing section 20, the network IF section 51, or the like.

The OSD image generating section 303 generates a terminal combination presentation image for presentation of a compatible terminal combination based on information that is input from the terminal compatibility judging section 301, and outputs it to the display section 61.

The terminal compatibility judging process is thus executed by the system consisting of the above-described individual modules.

Figure 4:
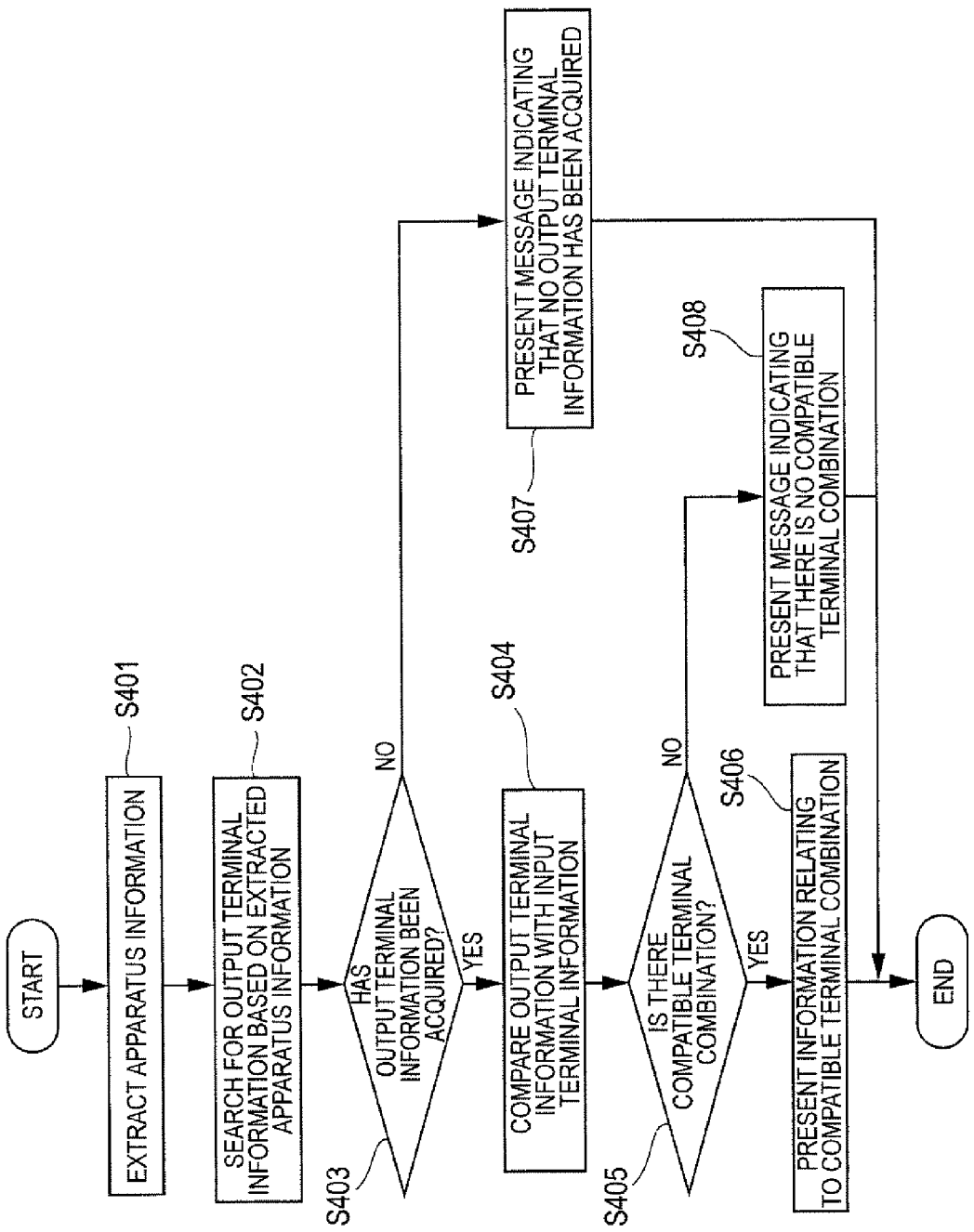
FIG. 4 illustrates the terminal compatibility judging process according to the first embodiment.

Next, the terminal compatibility judging process which is executed by the system described above with reference to FIGS. 1-3 will be described step by step with reference to FIG. 4. FIG. 4 illustrates the terminal compatibility judging process according to the first embodiment.

First, when the light receiving section 32 receives a signal transmitted from the remote controller RCb and outputs it to the terminal compatibility judging section 301, at step S401 the terminal compatibility judging section 301 extracts apparatus information from the signal that is input from the light receiving section 32. The apparatus information thus extracted is apparatus information indicating a type number etc. of a signal output apparatus to be manipulated by the remote controller RCb that sent the signal that was received by the light receiving section 32.

At step S402, the terminal compatibility judging section 301 searches the output terminal information storage section 312 for output terminal information that is correlated with the extracted apparatus information.

If no apparatus information is extracted or no output terminal information is acquired (S403: no), at step S407 the terminal compatibility judging section 301 requests the OSD image generating section 303 to generate an OSD message indicating that no output terminal information has been acquired. The OSD image generating section 303 outputs a requested OSD image to the display section 61 and the display section 61 presents the OSD image.

If output terminal information has been acquired (S403: yes), at step S404 the terminal compatibility judging section 301 stores the acquired output terminal information in the RAM 302 and determines compatible terminal combinations by comparing the thus-stored output terminal information with the input terminal information relating to the signal input terminals 25a-25d which are stored in the input terminal information storage section 311.

Compatible terminal combinations are determined taking into consideration resolution limit value of a transmittable signal, stability of signal quality of a signal transmission method, and other factors.

If there is no input terminal information that matches output terminal information (S405: no), at step S408 the terminal compatibility judging section 301 requests the OSD image generating section 303 to generate an OSD message indicating that there is no compatible terminal combination. The OSD image generating section 303 outputs a requested OSD image to the display section 61 and the display section 61 presents the OSD image.

On the other hand, if a compatible terminal combination is found (S405: yes), at step S406 the terminal compatibility judging section 301 outputs information relating to the compatible terminal combination to the OSD image generating section 303 and requests the OSD image generating section 303 to generate an OSD image for presentation of the information relating to the thus-found terminal combination. The OSD image generating section 303 generates a terminal combination presentation image for presentation of the information relating to the thus-found terminal combination based on the received information, and outputs it to the display section 61.

Next, an example terminal combination presentation image that is generated by the OSD image generating section 303 and output to the display section 61 will be described with reference to FIG. 5.

Figure 5:
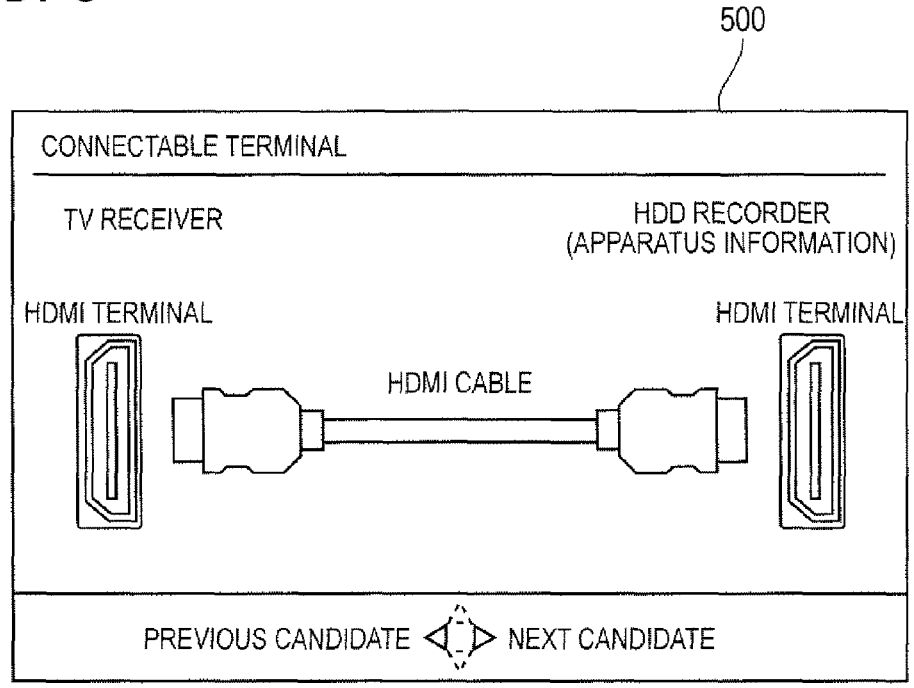
FIG. 5 illustrates an example terminal combination presentation image.

FIG. 5 illustrates a case that, in the system of FIG. 2, the TV receiver 10 is equipped with four signal input terminals that are a pin terminal, an S terminal, a D terminal, and an HDMI terminal (video signal input terminals 25a-25d), and the HDD recorder 200 (signal output apparatus) is equipped with three signal output terminals that are a pin terminal, an S terminal, and an HDMI terminal (video signal output terminals 225a-225c).

In this example case, the terminal compatibility judging section 301 judges that the pin terminal, the S terminal, and the HDMI terminal are common to the terminals of the TV receiver 10 and the terminals of the HDD recorder 200, and that the HDMI terminal combination is suitable for signal transmission among those terminal combinations. The terminal compatibility judging section 301 requests the OSD image generating section 303 to generate an image for presentation of information relating to the HDMI terminal combination, and the OSD image generating section 303 generates a terminal combination presentation image 500.

The information relating to the HDMI terminal combination is presented by the terminal compatibility judging process as a terminal combination that is suitable for the connection between the TV receiver 10 and the HDD recorder 200.

More specifically, graphic images indicating the shape of the HDMI terminal of the TV receiver 10 (signal input terminal side), the shape of the HDMI terminal of the HDD recorder 200 (signal output terminal side), the shape of an HDMI cable connecting the two HDMI terminals, etc. are presented in the terminal combination presentation image 500. Apparatus information such as the type number of the HDD recorder 200 is also presented.

Outside the terminal combination presentation image 500, there is provided guides of manipulations for switching to previous or next terminal combination candidate to be made through right/left key (not shown) of the remote controller RCa for the TV receiver 10 or the like.

The next terminal combination candidate is one, enabling signal transmission of highest quality next to the signal transmission quality of the currently presented terminal combination, of combinations from the terminals of the TV receiver 10 and the terminals of the HDD recorder 200 that have been judged compatible.

More specifically, if switching to an image for presentation of a next terminal combination candidate is selected by pressing the right key (not shown) provided in the manipulation section 31 or the remote controller RCa in a state that the HDMI terminal combination is presented, information relating to the S terminal combination is presented. If switching to an image for presentation of a next terminal combination candidate is selected again, information relating to the pin terminal combination is presented. The TV apparatus 10 may be configured so that the pieces of information relating to the above terminal combination candidates are presented sequentially in loop form.

All terminal combination candidates may be presented in the same terminal combination presentation image. In this case, the pieces of information (graphic images indicating the shapes etc.) relating to of the three terminal combinations, that is, the HDMI terminal combination, the S terminal combination, and the pin terminal combination, are presented in the same terminal combination presentation image.

If a video signal is input from the HDD recorder 200 via the HDMI terminal combination in a state that the HDMI terminal combination is being presented as a compatible one in the terminal combination presentation image 500, the signal processing control section 40 may perform a control for displaying that video signal on the display section 61 automatically, that is, without a user manipulation.

The external signal input section 21 may detect whether or not a signal output terminal of an external signal output apparatus other than the HDD recorder 200 is connected to one of the signal input terminals 25a-25d, and the terminal compatibility judging section 301 may determine signal input terminals suitable for a connection to the HDD recorder 200 while providing a priority to the non-connected signal input terminals based on the terminal connection state detection result. If a terminal connection state detection result shows that a signal input terminal suitable for a connection to the HDD recorder 200 is already connected to another external apparatus, the terminal compatibility judging section 301 may request the OSD image generating section 303 to generate an image for presentation of not only information relating to a terminal combination suitable for a connection to the HDD recorder 200 but also a message that requests a change of the connection destination of the signal input terminal suitable for a connection to the HDD recorder 200.

As described above, the TV receiver 10 according to the first embodiment receives a signal that is transmitted from a remote controller for manipulation of a signal output apparatus and contains apparatus information, determines one or ones, suitable for the signal input terminals 25a-25d of the TV receiver 10 itself, of the signal output terminals of the signal output apparatus based on the received apparatus information, and presents information relating to the terminal combination(s) including the determined signal output terminal(s). Therefore, the user is allowed to easily connect an electronic apparatus having output terminals and an electronic apparatus having input terminals.

(Modification)

In the first embodiment, a signal transmitted from the remote controller RCb for the HDD recorder 200 (signal output apparatus) includes apparatus information indicating the type number etc. of the HDD recorder 200. Now, there will be described that a modification in which a signal transmitted from the remote controller RCb includes series information indicating a series number or the like of a series to which the HDD recorder 200 belongs rather than the apparatus information indicating the type number of the HDD recorder 200 itself.

That is, this modification corresponds to the case where plural signal output apparatus having different type numbers are equipped with the same types of signal output terminals, all of those plural signal output apparatus are classified into a single group having one series number (unique identifier) as series information. For example, this modification is applied to a case that HDD recorders are equipped with the same types of signal output terminals, but different type numbers are designated thereto depending on the capacity of the HDD (recording medium).

Whereas some of the blocks operate differently than in the first embodiment (see FIGS. 1-4), the modification provides the same advantages as the first embodiment.

The remote controller RCb sends a signal containing series information and the light receiving section 32 receives it. The output terminal information storage section 312 is stored with pieces of output terminal information that is correlated with respective pieces of series information. The terminal compatibility judging section 301 extracts series information from a signal that is input from the light receiving section 32 and acquires output terminal information from the output terminal information storage section 312 based on the extracted series information.

As such, this modification provides the same advantages as the first embodiment.

Second Embodiment

Next, a second embodiment will be described with reference to the drawings.

In the second embodiment, referring to FIG. 2, the signal transmitted from the remote controller RCb for the HDD recorder 200 (signal output apparatus) contains output terminal information indicating types etc. of all the signal output terminals 225a-225c of the HDD recorder 200 rather than the apparatus information or series information.

The TV receiver 10 receives a signal transmitted from the remote controller RCb and containing output terminal information relating to the signal output terminals 225a-225c and extracts the output terminal information from the received signal. Furthermore, the TV receiver 10 determines compatible terminal combinations based on the extracted output terminal information relating to the signal output terminals 225a-225c and the input terminal information relating to the signal input terminals 25a-25d of the TV receiver 10 itself.

Figure 6:
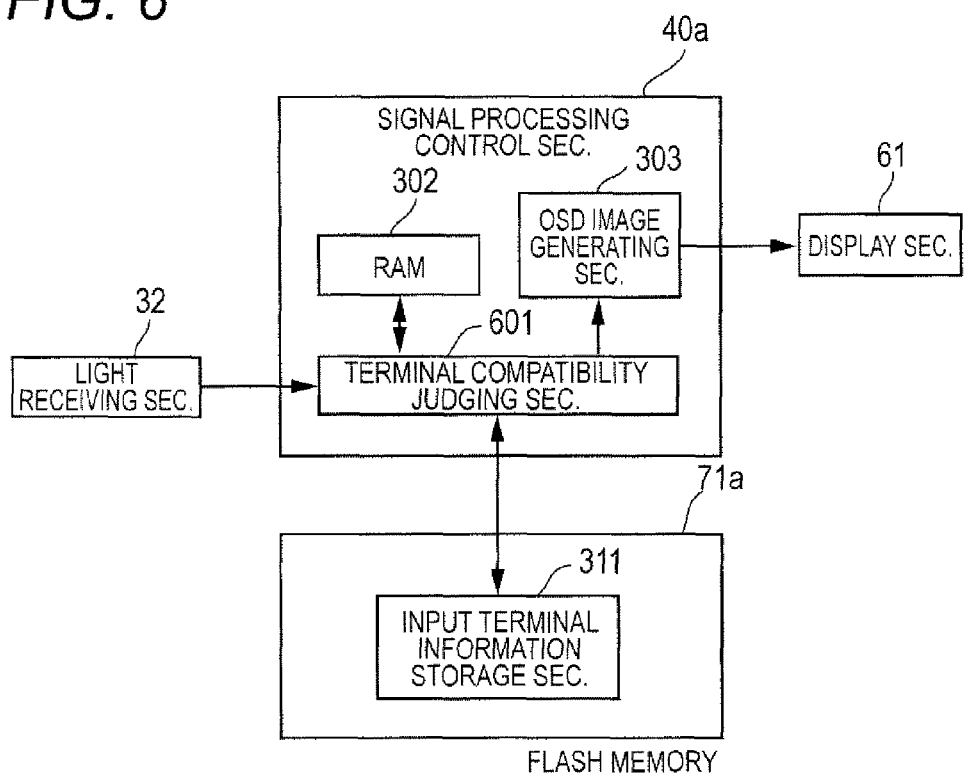
FIG. 6 is a view for explaining a terminal compatibility judging process according to the second embodiment for determining compatible terminal combinations based on information received from a remote controller and presenting them.

Next, the configuration for a terminal compatibility judging process according to the second embodiment will be described with reference to FIG. 6. FIG. 6 is a view for explaining plural modules that are provided in a signal processing control section 40a and a flash memory 71a and serves to execute the terminal compatibility judging process.

The signal processing control section 40a of the second embodiment is different from the signal processing control section 40 of the first embodiment in that a terminal compatibility judging section 601 executes a different process than the terminal compatibility judging section 301 of the first embodiment and a flash memory 71a is not equipped with the output terminal information storage section 312 of the first embodiment. Blocks shown in FIG. 6 each of which performs processing that is equivalent to the processing performed by the corresponding block shown in FIG. 3 are given the same reference numerals as the corresponding blocks shown in FIG. 3. In the following, features that are different than in the first embodiment will mainly be described.

The terminal compatibility judging section 601 extracts output terminal information indicating the types of all signal output terminals 225a-225c of the HDD recorder 200 from a signal that is input from the light receiving section 32, and determines terminals that are suitable for a connection to the HDD recorder 200 by referring to the input terminal information stored in the input terminal information storage section 311 while using the RAM 302 as a work memory. The terminal compatibility judging section 601 outputs the thus-determined information relating to the compatible terminal combinations to the OSD signal generating section 303 and requests the OSD signal generating section 303 to generate an image based on the information thus output.

That is, in the second embodiment, the terminal compatibility judging section 601 determines terminal combinations suitable for a connection to an external apparatus based on information that is input from the light receiving section 32 while exchanging information with the RAM 302 and the input terminal information storage section 311, and the OSD image generating section 303 and the display section 61 present information relating to compatible terminal combinations.

Figure 7:
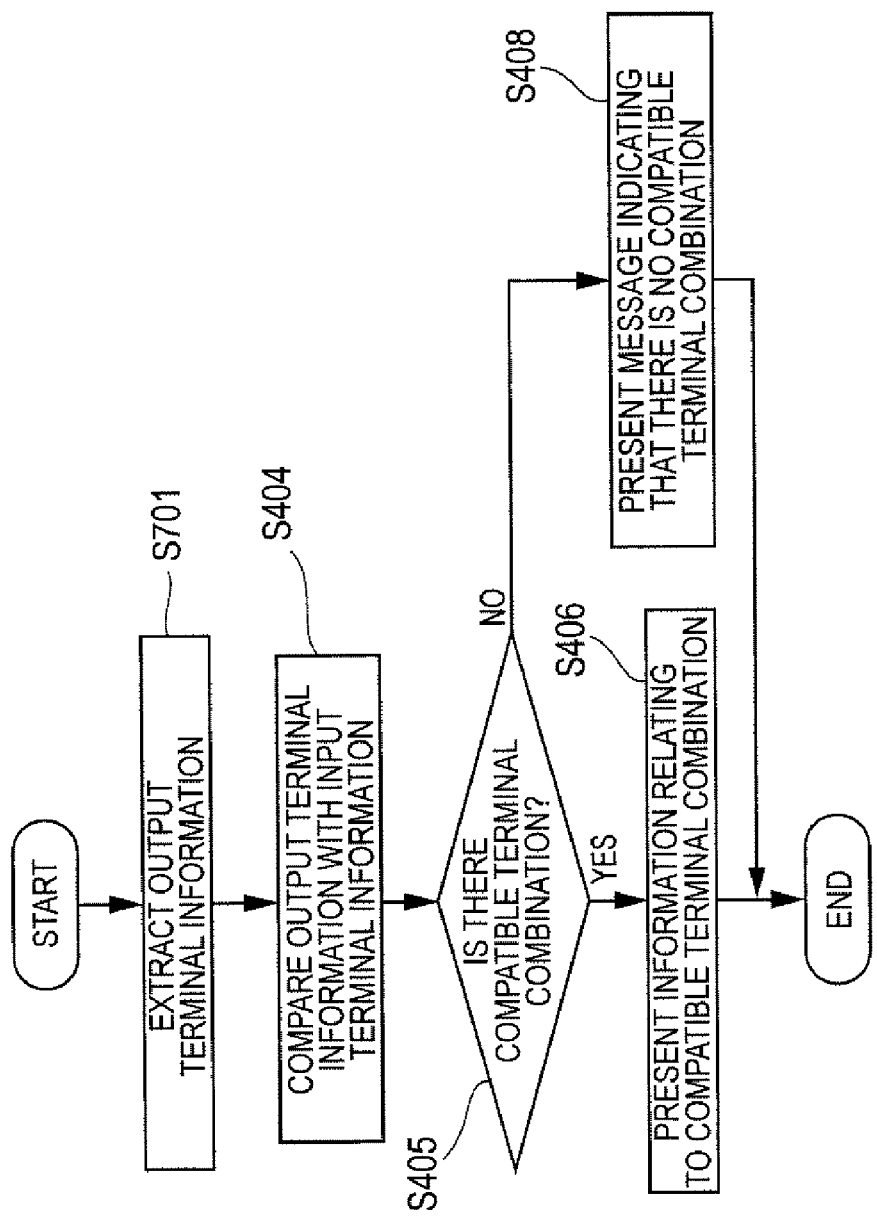
FIG. 7 illustrates the terminal compatibility judging process according to the second embodiment.

Next, the terminal compatibility judging process which is executed by the system described above with reference to FIG. 6 will be described step by step with reference to FIG. 7. FIG. 7 illustrates the terminal compatibility judging process according to the second embodiment.

The second embodiment is different from the first embodiment in that the terminal compatibility judging section 601 extracts output terminal information (the terminal compatibility judging section 301 of the first embodiment extracts apparatus information).

First, when the light receiving section 32 receives a signal transmitted from the remote controller RCb and outputs it to the terminal compatibility judging section 601, at step S701 the terminal compatibility judging section 601 extracts output terminal information from the signal that is input from the light receiving section 32. The output terminal information thus extracted is output terminal information indicating types etc. of signal output terminals of a signal output apparatus to be manipulated by the remote controller RCb.

At step S404, the terminal compatibility judging section 601 stores the acquired output terminal information in the RAM 302 and determines compatible terminal combinations by comparing the thus-stored output terminal information with the input terminal information stored in the input terminal information storage section 311. If it is judged that there is no input terminal information that matches output terminal information (S405: no), at step S408 the OSD image generating section 303 generates an OSD message indicating that there is no compatible terminal combination and outputs it to the display section 61.

If a compatible terminal combination is found (S405: yes), at step S406 the terminal compatibility judging section 601 outputs information relating to the compatible terminal combination to the OSD image generating section 303 and requests the OSD image generating section 303 to generate an OSD image for presentation of the information relating to the thus-found terminal combination. The OSD image generating section 303 generates a terminal combination presentation image for presentation of the information relating to the thus-found terminal combination based on the received information, and outputs it to the display section 61.

The terminal combination presentation image in the second embodiment is equivalent to the terminal combination presentation image 500 shown in FIG. 5.

As described above, the TV receiver according to the second embodiment receives a signal that is transmitted from a remote controller for manipulation of a signal output apparatus and contains output terminal information, determines one or ones, suitable for the signal input terminals 25a-25d of the TV receiver itself, of the signal output terminals of the signal output apparatus based on the received output terminal information, and presents information relating to the compatible terminal combination(s) including the determined signal output terminal(s). Therefore, the user is allowed to easily connect an electronic apparatus having output terminals and an electronic apparatus having input terminals.

Although the first and second embodiments are directed to terminal combinations for a video signal, it goes without saying that the embodiments can also be applied to terminal combinations for an audio signal.

The invention is not limited to the above embodiments and various modifications, changes, etc. are possible without departing from the spirit and scope of the invention.

According to an aspect of the present invention, it is possible to allow a user to easily connect electronic apparatus to each other.

What is claimed is:

1. An information presentation apparatus, comprising:
video/audio signal input terminals to be connected to at least one of video/audio signal output terminals of a signal output apparatus, the output terminals being different from one another in shape or standard;
a receiving module configured to receive an apparatus information to uniquely specify the signal output apparatus, the apparatus information being included in a signal for manipulating the signal output apparatus and transmitted from a remote controller for manipulating the signal output apparatus;
an output terminal information storing module configured to store output terminal information indicating kinds of all the output terminals of the signal output apparatus while being related with the apparatus information;
a determination module configured to determine a compatible terminal connection among connections of all the input terminals and all the output terminals based on the output terminal information and the received apparatus information; and
a presentation module configured to present the determined compatible terminal connection.

2. The apparatus of claim 1, wherein, as a presentation of the compatible terminal connection, the presentation module presents:
a shape of a corresponding output terminal;
a shape of a corresponding input terminal; and
a shape of a cable that connects the output terminal and the input terminal.

3. The apparatus of claim 2, wherein the presentation module presents, among the compatible terminal connections,
one terminal connection through which a highest-level signal transmission is available, and
another terminal connection through which a next-highest-level signal transmission to the highest-level signal transmission is available, upon a request to present a terminal connection through which the next-highest-level signal transmission is available.

4. The apparatus of claim 2, wherein the presentation module presents all the compatible terminal connections together in a single image.

5. The apparatus of claim 2, further comprising:
a terminal selection module configured to detect a presence/absence of a video/audio signal input to the input terminal included in the currently-presented terminal connections,
wherein, if a video/audio signal is input to the input terminal included in the currently-presented terminal connections, the video signal is displayed to a display module.

6. The apparatus of claim 2, further comprising:
a connection-state detection module configured to detect, for each of the input terminals, whether or not any one of the output terminals is connected therewith,
wherein, if there exists the input terminal to which any one of the output terminals is connected, the determination module determines the compatible terminal connections by excluding the terminal-connected input terminal therefrom, or
wherein, if there exists the input terminal to which any one of the output terminals is connected and the input terminal is included in the detected terminal connections, the presentation module presents a message to request changing for a connection of the input terminal to which the any one of the output terminals is connected.

7. An information presentation apparatus, comprising:
video/audio signal input terminals to be connected to at least one of video/audio signal output terminals of a signal output apparatus, the output terminals being different from one another in shape or standard;
a receiving module configured to receive output terminal information indicating kinds of all the output terminals of the signal output apparatus, the output terminal information being included in a signal for manipulating the signal output apparatus and transmitted from a remote controller for manipulating the signal output apparatus;
a determination module configured to determine a compatible terminal connection among connections of all the input terminals and all the output terminals based on the received output terminal information; and
a presentation module configured to present the determined compatible terminal connection.

8. The apparatus of claim 7, wherein, as a presentation of the compatible terminal connection, the presentation module presents:
a shape of a corresponding output terminal;
a shape of a corresponding input terminal; and
a shape of a cable that connects the output terminal and the input terminal.

9. The apparatus of claim 8, wherein the presentation module presents, among the compatible terminal connections,
one terminal connection through which a highest-level signal transmission is available, and
another terminal connection through which a next-highest-level signal transmission to the highest-level signal transmission is available, upon a request to present a terminal connection through which the next-highest-level signal transmission is available.

10. The apparatus of claim 8, wherein the presentation module presents all the compatible terminal connections together in a single image.

11. The apparatus of claim 8, further comprising:
a terminal selection module configured to detect a presence/absence of a video/audio signal input to the input terminal included in the currently-presented terminal connections,
wherein, if a video/audio signal is input to the input terminal included in the currently-presented terminal connections, the video signal is displayed to a display module.

12. The apparatus of claim 8, further comprising:
a connection-state detection module configured to detect, for each of the input terminals, whether or not any one of the output terminals is connected therewith,
wherein, if there exists the input terminal to which any one of the output terminals is connected, the determination module determines the compatible terminal connections by excluding the terminal-connected input terminal therefrom, or
wherein, if there exists the input terminal to which any one of the output terminals is connected and the input terminal is included in the detected terminal connections, the presentation module presents a message to request changing for a connection of the input terminal to which the any one of the output terminals is connected.

13. An information presentation method by an information presentation apparatus, the apparatus comprising:
video/audio signal input terminals to be connected to at least one of video/audio signal output terminals of a signal output apparatus, the output terminals being different from one another in shape or standard,
the method comprising:
receiving an apparatus information to uniquely specify the signal output apparatus, the apparatus information being included in a signal for manipulating the signal output apparatus and transmitted from a remote controller for manipulating the signal output apparatus;
determining a compatible terminal connection among connections of all the input terminals and all the output terminals based on output terminal information and the received apparatus information, the output terminal information indicating kinds of all the output terminals of the signal output apparatus while being related with the apparatus information; and
presenting the determined compatible terminal connection.

* * * * *